US006015656A

United States Patent [19]

Nagami

[11] Patent Number: 6,015,656

[45] Date of Patent: Jan. 18, 2000

[54] TABULAR SILICA DISPERSION AND SILVER HALIDE PHOTOGRAPHIC LIGHT SENSITIVE MATERIAL

[75] Inventor: Ken Nagami, Hino, Japan

[73] Assignee: Konica Corporation, Japan

[21] Appl. No.: 09/356,777

[22] Filed: Jul. 16, 1999

[30] Foreign Application Priority Data

Jul. 21, 1998 [JP] Japan .................................. 10-204990

[51] Int. Cl.$^{7}$ ............................... G03C 1/76; G03C 1/30; G03C 1/04; G03C 1/047; C08L 89/00

[52] U.S. Cl. .......................... 430/531; 430/523; 430/539; 430/621; 430/623; 430/624; 430/626; 430/628; 430/608; 430/640; 430/961; 106/144.1; 106/144.2; 106/144.6; 106/144.7; 106/157.7; 106/157.71

[58] Field of Search ..................................... 430/523, 531, 430/527, 539, 628, 623, 624, 626, 640, 621, 608, 961; 106/144.1, 144.2, 144.6, 144.7, 157.7, 157.71

[56] References Cited

U.S. PATENT DOCUMENTS

| | | | |
|---|---|---|---|
| 3,441,412 | 4/1969 | Himmelmann et al. | 430/640 |
| 4,173,480 | 11/1979 | Woodward | 430/536 |
| 5,352,563 | 10/1994 | Kawasaki et al. | 430/640 |
| 5,478,709 | 12/1995 | Vandenabeele | 430/527 |
| 5,792,600 | 8/1998 | Nagami | 430/539 |
| 5,807,662 | 9/1998 | Takahashi | 430/523 |
| 5,869,217 | 2/1999 | Aono | 430/539 |
| 5,869,227 | 2/1999 | Majumdar et al. | 430/527 |
| 5,891,611 | 4/1999 | Majumdar et al. | 430/527 |

*Primary Examiner*—Richard L. Schilling
*Attorney, Agent, or Firm*—Jordan B. Bierman; Bierman, Muserlian and Lucas

[57] ABSTRACT

A tabular silica dispersion is disclosed, which is obtained by mixing a tabular silica, gelatin, a cyclodextrin and a compound capable of crosslinking gelatin. Silver halide photographic materials are also disclosed, in which the tabular silica dispersion is incorporated into a silver halide emulsion layer or a light-insensitive hydrophilic colloidal layer.

15 Claims, No Drawings

TABULAR SILICA DISPERSION AND SILVER HALIDE PHOTOGRAPHIC LIGHT SENSITIVE MATERIAL

FIELD OF THE INVENTION

The present invention relates to a tabular silica dispersion and silver halide photographic light sensitive materials containing the dispersion.

BACKGROUND OF THE INVENTION

Recently, advancements of electronics have resulted in markedly shortening of the access time to images so that rapid access for silver halide photographic materials is desired. Enhanced sensitivity of silver halide grains is also required and tabular silver halide grains are often employed. Tabular silver halide grains increase the grain projected area, leading to an increased light-receiving area per grain and tabular grains also increase adsorption of a sensitizing dye, leading to enhance spectral sensitivity.

U.S. Pat. Nos. 4,386,156, 4,399,215, 4,414,304 and 4,425,425 disclose tabular silver halide grains used in photographic materials.

To enhance rapid processability, there has been attempted reduction of the amount of gelatin used as a protective binder for silver halide grains to promote developing, fixing, washing and drying. However, reduction of gelatin deteriorated pressure resistance of silver halide grains. To overcome this problem, attempts to improve preparation of silver halide grains have been made, but silver halide grains with enhanced pressure resistance as well as high sensitivity and less fogging have not yet achieved.

A technique of incorporating latexes as a plasticizer to enhance pressure resistance was disclosed in JP-B 53-28086 (herein, the term, JP-B means a published Japanese Patent) and Research Disclosure, vol. 195, July 1980. A technique of employing latexes in combination with tabular silver halide grains was also disclosed in JP-A 2-135335 (herein, the term, JP-A means a unexamined and published Japanese Patent Application). In these techniques, however, reduction of gelatin to achieve rapid processing and the use of a large amount of a latex to enhance pressure resistance resulted in deterioration in physical property of layers, such as blocking (or sticking).

JP-A 4-214551, 4-340951, 5-53230 and 5-53237 disclose a technique of incorporating colloidal silica into a silver halide emulsion layer to enhance pressure resistance. According to this technique, deterioration in physical property was prevented, however, incorporation in effective amounts thereof produced disadvantages such that cracking occurred during storage of processed films. As a means for improving this, JP-A 6-95300 discloses a technique of surface-treating colloidal silica to introduce a functional group capable of crosslinking gelatin. Thereby, cracking during storage was prevented but reduction of sensitivity was marked, particularly when subjected to rapid processing. The use of natural or synthetic aqueous-soluble polymers is known to prevent reduction of sensitivity. However, incorporation of a large amount of the aqueous-soluble polymer produced problems such that the polymer leached out of a processed photographic material into a processing solution, resulting in stain in the solution or on rollers of an automatic processor. Accordingly, a silver halide photographic material with superior processability and a processing method thereof.

SUMMARY OF THE INVENTION

To solve problems described above, an object of the present invention is to provide a silver halide photographic material exhibiting enhanced pressure resistance and superior rapid processability without causing stain in processing.

The above object of the present invention can be accomplished by the following constitution:

1. a tabular silica dispersion obtained by mixing a tabular silica, gelatin, a cyclodextrin and a compound capable of crosslinking gelatin; and
2. a silver halide photographic light-sensitive material comprising a support having thereon a silver halide emulsion layer and a light-insensitive hydrophilic colloidal layer, wherein said photographic material is obtained by coating a coating composition obtained by incorporating a tabular silica dispersion as described above into a composition constituting the silver halide emulsion layer or light-insensitive hydrophilic colloidal layer.

DETAILED DESCRIPTION OF THE INVENTION

The tabular silica used in the invention is referred to layered silicates containing an alkaline metal, alkaline earth metal or aluminum, including kaolin minerals, mica clay minerals and smectite. Examples of kaolin minerals include kaolinite, dickite, nacrite, halloysite and serpentine. Examples of mica clay minerals include pyrophylite, talc, white mica, synthetic fluoromica with swelling capability, sericite and chlorite. Examples of smectite include smectite, vermiculite and synthetic fluorovermiculite with swelling capability. Of these is preferred deionizable smectite with swelling capability. The smectite includes two kinds thereof, such as natural or synthetic smectite. Examples of the natural smectites include montmorillonite and beidellite, which are obtained as clay, so-called bentnite or acid clay. JP-A 60-202438 and 60-239747 disclose these smectites which are incorporated, as an antistatic agent, in a hydrophilic colloidal light-insensitive layer. However, synthetic smectites are preferably employed in terms of superior transparency and there is also available a smectite containing fluorine for the purpose of enhancing heat resistance. Examples of synthetic smectites include Lucentite SWN and Lucentite SWF sold by Cope Chemical Corp.

The tabular silica has preferably a mean diameter of 2 to 300 nm, and more preferably 5 to 200 nm, and having preferably a thickness of 1 to 150 nm, and more preferably 2.5 to 100 nm. At least 50% of the projected area of the total silica used is preferably tabular silica having an aspect ratio of from 2 to 100, and more preferably 2 to 50. The aspect ratio is referred to as a ratio of a diameter of a circle having an area identical to the projected area (which is so-called equivalent circle diameter) to a spacing between two parallel planes, i.e., thickness. The thickness of the tabular silica used in the invention is preferably not more than 1.0 $\mu$m, and more preferably not more than 0.5 $\mu$m, more preferably 1 to 150 nm, and still more preferably 10 to 50 nm. A variation coefficient of tabular silica particle size distribution is preferably not more than 30%, and more preferably not more than 20%, wherein the variation coefficient is a standard deviation obtained when the projected area is approximated by a circle (denoted as S) divided by an equivalent circle diameter (denoted as D), that is, $S/D \times 100\%$).

Gelatin used in the invention include alkali process gelatin, acid process gelatin, and gelatin derivatives such as enzyme-treated gelatin described in Bull. Soc. Sci. Phot. Japan, No. 16, 30 (1966) and phthalated gelatin. The total amount of gelatin contained in hydrophilic colloidal layers is preferably 1.3 to 3.0 $g/m^2$, and more preferably 1.5 to 2.5 g/m$^2$ of one side. The amount of gelatin contained in an emulsion layer is preferably 0.4 to 2.0 g/m$^2$, and more preferably 0.5 to 1.5 g/m$^2$ of one side.

Cyclodextrins used in the invention may be any compound having a ring structure of cyclodextrin, including conventionally known cyclodextrins such as α-cyclodextrin, β-cyclodextrin, γ-cyclodextrin; branched cyclodextrin which is branchedly added or bonded with glucose, maltose or saccharose; and compounds which is the above-described cyclodextrins substituted by a substituent such as an alkyl group. Cyclodextrins used in the invention are preferably those represented by the following formula (A):

Formula (A)

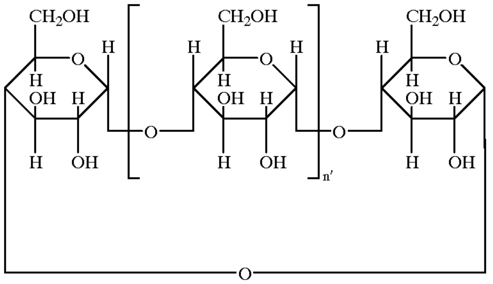

where n' is an integer of from 4 to 10.

Cyclodextrins which are capable of crosslinking gelatin are also preferably used in the invention. The cyclodextrins capable of crosslinking gelatin are those in which at least a part of hydroxy groups contained in the cyclodextrin represented by formula (A) above is partially modified (or substituted) with a compound capable of crosslinking gelatin, and which are preferably represented by the following formula (B):

Formula (B)

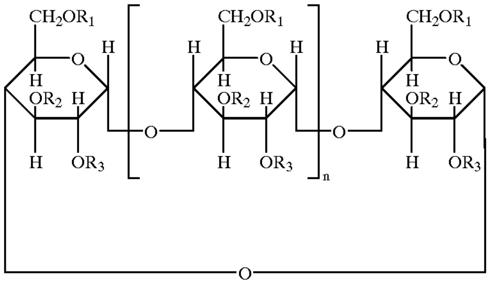

where $R_1$, $R_2$ and $R_3$ each represent a hydrogen atom, an alkyl group, an alkenyl group, an aryl group, heterocyclic group, each of which may be substituted, or a group capable of crosslinking gelatin; and n is an integer of 4 to 10, provided that the formula contains at least two groups capable of crosslinking gelatin, in other words, the number of the group capable of crosslinking gelatin is at least two per molecule.

The group capable of crosslinking gelatin may be one containing a group capable of reacting with an amino or carboxyl group contained in gelatin. The group capable of crosslinking gelatin can be introduced by using a compound which contains an alcoholic hydroxy group and a group capable of reacting with an amino or carboxyl group contained in gelatin. Examples of such a compound include 2-hydroxy-4,6-dichloro-s-triazine, epichlorohydrin, epibromohydrin, epifluorohydrin, epiiodohydrin, ethylchloroformate, phenylchloroformate, 3-hydroxyphenylchloroformate, 3-methoxyphenylchloroformate, 2-chloroethylchloroformate, and 4-chlorophenylchloroformate. Of these compounds, a 2-hydroxy4,6-dichloro-s-triazine, epichlorohydrin, and ethylchloroformate groups are preferred, and specifically, 2-hydroxy-4,6-dichloro-s-triazine group is more preferred.

The cyclodextrin in which the group capable of crosslinking gelatin has been introduced by using the compound described above, is also called a modified cyclodextrin. Thus, according to the invention, the modified cyclodextrin contains at least two groups capable of crosslinking gelatin per molecule to function as a cross-linking agent. The cyclodextrins (including theose which contain a group capable of crosslinking gelatin, is added to the tabular silica dispersion, preferably in an amount of from 0.01 to 1.0 mol, and more preferably 0.05 to 0.5 mol per g of gelatin contained in the dispersion.

Exemplary examples of the cyclodextrin containing a group capable of crosslinking gelatin are shown below but are not limited to these examples:

K1: β-cyclodextrin/2-hydroxy-4,6-dichloro-s-triazine sodium salt (in which the average number of the group capable of crosslinking gelatin, per molecule is 2.3);

K2: β-cyclodextrin to which one maltose molecule is attached/2-hydroxy-4,6-dichloro-s-triazine sodium salt (in which the average number of the group capable of crosslinking gelatin, per molecule is 2.3);

K3: β-cyclodextrin/epichlorohydrin (in which the average number of the group capable of crosslinking gelatin, per molecule is 2.4);

K4: β-cyclodextrin to which one maltose molecule is attached/epichlorohydrin (in which the average number of the group capable of crosslinking gelatin, per molecule is 2.4);

K5: β-cyclodextrin/ethylchloroformate (in which the average number of the group capable of crosslinking gelatin, per molecule is 2.4).

In the above, for example, K1 represents a β-cyclodextrin containing a group capable of crosslinking gelatin, which is obtained by allowing 2-hydroxy-4,6-dichloro-s-triazine sodium salt to be attached to the cyclodextrin, e.g., in the manner described below.

These compounds can be readily synthesized by the method described in German Patent OLS No. 2,357,252 and JP-A 63-83720 and 63-168643, as exemplarily shown below.

Synthesis of K1

β-Cyclodextrin of 36.0 g was dissolved in 500.0 g of water and the pH was adjusted to 8.5 with NaOH. To the resulting solution was added 41.0 g of 2-hydroxy-4,6-dichloro-s-triazine sodium salt and was stirred over a period of 5 hr., while the pH was maintained at 8 to 9 with NaOH and the temperature was kept at 15° C. The resulting reaction mixture was refined and obtained as a powdery product by the spray-drying method.

In cases where a cyclodextrin containing a group capable of crosslinking gelatin is used in the invention, the dispersion according to the invention is comprised of a tabular silica, gelatin and the cyclodextrin containing a group capable of crosslinking gelatin.

The compound capable of crosslinking gelatin includes a hardener which is capable of hardening gelatin, including aldehyde compounds, triazine compounds, vinyl compounds and carboxyl group-activating type hardeners described in JP-A 63-61243.

Silane coupling agents are preferably employed in the tabular silica dispersion according to the invention. Silane coupling agents usable in the invention may be those containing a functional group capable of crosslinking gelatin, as described in JP-B 48-3565 and JP-A 58-38950, 59-42540 and 62-209452, and preferably those containing an amino and/or epoxy group. Exemplary examples of the silane coupling agents are shown below, but are not limited to these examples.

(1)

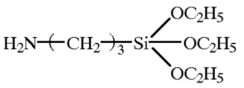

(2)

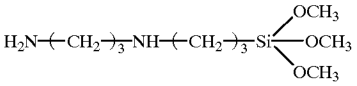

(3)

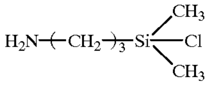

(4)

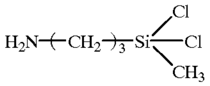

(5)

$H_2N-(CH_2)_3-SiCl_3$ (6)

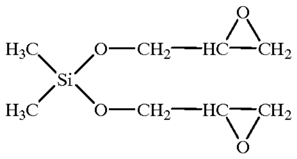

(7)

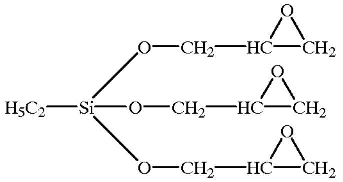

(8)

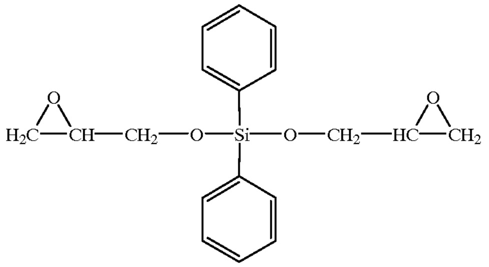

(9)

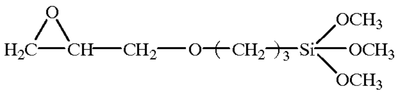

-continued (10)

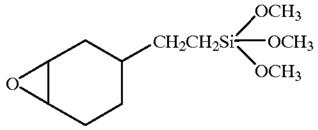

(11)

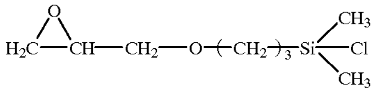

(12)

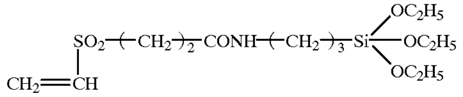

The silane coupling agent may be used alone or in combination. Reaction of the silane coupling agent with the tabular silica is preferably conducted by allowing a silane coupling agent to react with tabular silica dispersed in water or an organic solvent.

The tabular silica dispersion used in the invention can be prepared, for example, according to the following manner. After mixing a gelatin aqueous solution, a dispersion of tabular silica dispersion in water, a cyclodextrin aqueous solution or an aqueous solution of a cyclodextrin capable of cross-linking with gelatin, a compound capable of crosslinking gelatin in limited amounts was added to the mixture, while maintaining a temperature at 30 to 80° C. and stirring with a high-speed stirrer with sufficient shearing force (e.g., homomixer, impeller, etc.), and the mixture was further dispersed over a period of 1 to 72 hr. to obtain the dispersion.

In the invention, the tabular silca is surrounded by gelatin or ccylodetrin. Thus, it is contemplated that the tabular silica is miscible with gelatin, which is hardened with hardener, so that prevention of possible cracking is to be expected.

In preparation of the dispersion, to enhance miscibility of the tabular silica with gelatin is preferably used a silane coupling agent, as described in JP-A 4-257849 and 6-95300. To prevent coagulation is optionally employed a dispersing agent, including polyphosphates such as sodium pyrophosphate, sodium hexametaphosphate and sodium tripolyphosphate; polyhyroxyl alcohol such as sorbitol, trimethylolpropane, trimethylolethane and trimethylolmethane; and nonionic polymer such as polyethylene glycol alkyl ester.

Exemplary, preferred tabular silica dispersion are shown below.

Dispersion Example 1 (B-1)

Alkali-processed gelatin of 150 g was dissolved in 7650 ml of water, further thereto was added 1100 ml of a 10% β-cyclodextrin aqueous solution while maintaining a temperature of 40° C. and thereafter, was added 1000 g of Russentite SWN (30 wt. % aqueous dispersion, average particle diameter of 14 nm and available from Cope Chemical Corp.). To the resulting solution was added 220 ml of 3.7% Formalin solution in limited amounts in 1 min., while stirring with a high-speed homogenizer and stirring continued further for 5 hr at 50° C. The resulting dispersion was filtered with a filter with pores of 3 μm in diameter to remove coagulates.

Dispersion Example 2 (B-2)

Alkali-processed gelatin of 150 g was dissolved in 7650 ml of water, further thereto was added 1100 ml of a 10%

β-dextrin aqueous solution while maintaining a temperature of 40° C. and thereafter, was added 1000 g of Russentite SWN used in the above-described B-1, to which 3.0 g of 3-glycidyloxypropyltrimethoxysilane (corresponding to exemplified silane coupling agent (9)) was added at 50° C. in 1 hr. To the resulting solution was added 220 ml of 3.7% Formalin solution in limited amounts in 1 min., while stirring with a high-speed homomixer and stirring further continued at 50° C. for 10 hr. The resulting dispersion was filtered with a filter with pores of 3 μm in diameter to remove coagulates.

Dispersion Example 3 (B-3) Dispersion B-3 was obtained in a manner similar to B-1, except that the hardening agent was replaced by the following compound RH:

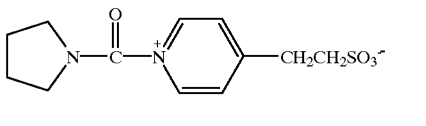

Dispersion Example 4 (B-4)

Dispersion B-4 was obtained in a manner similar to B-1, except that the alkali-processed gelatin was replaced by an equivalent amount of a acid-processed gelatin.

Dispersion Example 5 (B-5)

Dispersion B-5 was obtained in a manner similar to B-1, except that the β-cyclodextrin was replaced by cyclodextrin K1, capable of crosslinking gelatin.

Dispersion Example 6 (B-6)

Dispersion B-6 was obtained in a manner similar to B-1, except that the β-cyclodextrin was replaced by cyclodextrin K2, capable of crosslinking gelatin.

Dispersion Example 7 (B-7)

Dispersion B-7 was obtained in a manner similar to B-2, except that the β-cyclodextrin was replaced by cyclodextrin K1, capable of crosslinking gelatin.

Dispersion Example 8 (B-8)

Dispersion B-8 was obtained in a manner similar to B-2, except that the β-cyclodextrin was replaced by cyclodextrin K2, capable of crosslinking gelatin.

The tabular silica dispersion according to the invention is used preferably in an amount of 0.05 to 1.0%, and 0.1 to 0.7% by dry weight, based on gelatin used as binder in the layer to be incorporated. The gelatin used as binder in the layer to be incorporated include gelatin contained in the tabular silica dispersion.

Silver halide grains used in photographic materials according to the invention are preferably tabular grains to achieve high sensitivity. Halide composition is optional, including AgBr, AgCl, AgClBr, AgClBrI and AgBrI. Of these silver halide is preferred AgBrI containing high bromide.

The tabular grains, which are described in U.S. Pat. Nos. 4,439,520, 4,425,425 and 4,414,304, can be readily obtained in desired forms. In tabular grains, it is possible allow silver halide different in halide composition to be epitaxially grown at a specific position on the surface or to be shelled. Dislocation lines may be introduced into the surface or interior of tabular grains to control sensitivity specks.

At least 50% of the total projected area of silver halide grains contained in an emulsion layer is preferably accounted for by tabular grains having an aspect ratio of 2 or more. The proportion of the tabular grains is preferably 60% or more, more preferably 70% or more, still more preferably 80% or more. The aspect ratio refers to a ratio of a diameter of a circle having an area equivalent to the projected area of the tabular grain, to a distance between parallel planes (i.e., thickness). The aspect ratio according to the invention is preferably not less than 2 and less than 20, and more preferably not less than 3 and less than 16. The thickness of the tabular grains is preferably not more than 0.5 μm, and more preferably 0.3 μm. A monodisperse tabular grain emulsion is preferred, having a variation coefficient of grain size distribution, which is represented by the standard deviation (S) of circular equivalent diameter described above, divided by an average diameter (D), i.e., S/D, is preferably not more than 30%, and more preferably not more than 20%. Tabular grains may be blended with non-tabular, regular crystal grains.

There may be used silver halide solvents such as ammonia, thioether compounds and thione compounds to control grain growth of tabular grains. Metal salts such as zinc, thallium, iridium and rhodium may be copresent during physical ripening or chemical ripening.

Sulfur sensitization, selenium sensitization, tellurium sensitization, reduction sensitization, noble metal sensitization, and combination thereof can be employed in chemical ripening.

Sulfur sensitizers usable in the invention include those described in U.S. Pat. Nos. 1,574,944, 2,410,689, 2,278,947, 2,728,668, 3,501,313, and 3,656,955; West German Patent (OLS) 1,422,869; JP-A 56-24937 and 55-45016. Preferred examples thereof include thiourea derivatives such as 1,3-diphenylthiourea, triethylthiourea, 1-ethyl-3-(2-thiazolyl) thiourea, etc.; rhodanine derivatives; dithiacarbamic acid derivatives; polysulfide organic compounds; and sulfur simple substance. Of sulfur simple substances is preferred rhombic α-sulfur.

Selenium sensitization includes a variety of selenium sensitizers, as disclosed in U.S. Pat. Nos. 1,574,944, 1,602,592, 1,623,499, JP-A 60-150046, 4-25832, 4-109240 and 4-4-147250. Usable selenium sensitizers include colloidal selenium, isoselenocyanates (e.g., allyl isoselenocyanate), selenoureas (e.g., N,N-dimethylselenourea, N,N,N'-triethylselenourea, N,N,N'-trimethyl-N'-heptafluoroselenourea, N,N,N'-trimethyl-N'-heptafluoropropylcarbonylselenourea, N,N,N'-trimethyl-N'-4-nitrophenylcarbonylselenourea), selenoketones (e.g., selenoacetone, selenoacetophenone), selenoamides (e.g., selenoacetoamide, N,N-dimethylselenobenzamide), selenocarboxylic acids and selenoesters (e.g., 2-selenopropionic acid methy-3-selenobutyrate), selenophosphates (tri-p-triselenophosphate) and selenides (triphenyphosphineselenide, diethylselenide, diethyldiselenide). Among these sensitizers are preferable selenoureas, selenoamides, selenoketones and selenides.

Techniques for using selenium sensitizers are exemplarily described in U.S. Pat. Nos. 1,574,944, 1,602,592, 1,623,499, 3,297,446, 3,297,447, 3,320,069, 3,408,196, 3,408,197, 3,442,653, 3,420,670 and 3,591,385; French Patent 2,693,038 and 2,093,209; JP-B 52-34491, 52-34492, 53-295 and 57-22090; JP-A 59-180536, 59-185330, 59-181337, 59-187338, 59-192241, 60-150046, 60-151637, 61-246738, 3-4221, 3-24537, 3-111838, 3-116132, 3-148648, 3-237450, 4-16838, 4-25832, 4-32831, 4-4-96059, 4-109240, 4-1407384-140739, 4-147250, 4-149437, 4-184331, 4-190225, 4-191729, and 4-195035; English Patent 255846 and 861984; and H. E. Spence et al., Journal of Photographic Science Vol. 31, page 158–169 (1983).

The amount of the selenium sensitizer to be used depends on a selenium compound, silver halide grains and chemical ripening conditions, and in general, are within a range of $10^{-8}$ to $10^{-4}$ mol per mol of silver halide. According to properties of a selenium compound to be used, it may be added by a method in which it is dissolved in water or an organic solvent such as methanol or ethanol, a method in which it has been previously mixed a gelatin solution, by a method disclosed in JP-A 4-140739, thus in the form of a dispersion of mixture solution with an organic solvent-soluble polymer. Chemical ripening with a selenium sensitizer is carried out at a temperature of 40 to 90° C., preferably 45 to 80° C., and a pH of 4 to 9, preferably 6 to 9.5.

Tellurium sensitizers and sensitizing methods are described in U.S. Pat. Nos. 1,623,499, 3,320,069, 3,772,031, 3,655,394, British Patent 235,2111, 1,121,496, 1,295,462, 1,396,696, Canada Patent 800,958, JP-A 4-204640 and 4-333043. Examples of usable tellurium sensitizers include telluroureas (e.g., N,N-dimethyltellurourea, tetramethyltellurourea, N-carboxyethyl-N,N'-dimethyltellurourea, N,N'-dimethyl-N'-phenyltellurourea), phosphinetellurides (e.g., tributylphosphinetelluride, tricyclohexylphosphinetelluride, triisopropylphosphinetelluride, butyldiisopropylphosphinetelluride, dibutylphenylphosphinetelluride), telluroamides (e.g., telluroacetoamide, N,N-dimethyltellurobenzamide), telluroketones, telluroesters, isotellurocyanates. The tellurium sensitizer can be used in a manner similar to the selenium sensitizer.

Reduction sensitization is also preferably employed in combination with other sensitization. The reduction sensitization is preferably conducted during the course of grain growth. Examples thereof include not only a method in which growing silver halide grains are subjected to reduction sensitization, but also a method in which grain growth is interrupted, reduction sensitization is conducted and then reduction-sensitized grains are further allowed to be grown.

Gold sensitizers usable in the invention include not only chloroauric acid, gold thiosulfates and gold thiocyanates, but also gold complexes of thioureas, rhodanines and other compounds.

The amount to be used of sulfur sensitizers, selenium sensitizers, tellurium sensitizers, reduction sensitizers and gold sensitizers, depending on halide composition of silver halide, compound(s) to be used and ripening conditions, is preferably $1\times10^{-9}$ to $1\times10^{-4}$ mol, and more preferably $1\times10^{-8}$ to $1\times10^{-5}$ mol per mol of silver halide. Sulfur sensitizers, selenium sensitizers, tellurium sensitizers, reduction sensitizers or gold sensitizers may be added through solution in water, alcohols or other organic or inorganic solvents, or in the form of an emulsified dispersion using a water-insoluble solvent or a medium such as gelatin.

Spectral sensitizing dyes may be added at the time of grain growth or at any time of from after grain formation to coating, and preferably added before completion desalting. The pH at the time of addition to a reaction solution (conventionally, in a reaction vessel), is preferably 4 to 10, and more preferably 6 to 9; and the pAg of a reaction solution (in a reaction vessel) is preferably 5 to 11. Spectral sensitizing dyes used in the invention are optional. Cyanine dyes are preferably used. Specifically, compounds S-1 to S-124 represented by general formulas (I) to (III) described in JP-A 1-100533, are preferably used. Sensitizing dues may be used alone or in combination thereof, wherein two or more dyes may be added at the same time or separately. The addition amount thereof is 1 to 1000 mg, and more preferably 5 to 500 mg per mol of silver. Potassium iodide is preferably added prior to addition of a spectral sensitizing dye. Spectral sensitizing dyes may be directly dispersed in an emulsion, or incorporated in a solution form, through solution in an appropriate solvent, such as methanol, ethanol, methyl cellosolve, acetone, pyridine or a mixture thereof, in which ultrasonic homogenizer may be employed in dissolution. Water-insoluble spectral sensitizing dyes may be incorporated in the form of a solid particle dispersion by means of high-speed impeller dispersion.

Matting agents may be employed, including fine particles of homopolymers such as polymethyl methacrylate, copolymer of methyl methacrylate and methacrylic acid, organic compounds such as starch, and inorganic compounds such as silica, titanium dioxide, strontium sulfate and barium sulfate, as described in U.S. Pat. Nos. 2,992,101, 2,701,245, 4,142,894 and 4,396,706. The particle size is preferably 0.6 to 10 μm, and more preferably 1 to 5 μm.

Lubricants used in the surface layer of photographic materials used in the invention include silicone compounds described in U.S. Pat. Nos. 3,489,576 and 4,047,958, colloidal silica described in JP-B 56-23139, paraffin wax, higher fatty acids and starch derivatives.

Plasticizers such as trimethylol propane, pentanediol, butane diol, ethylene glycol and glycerin may be added in a component layer of the photographic material.

Polymeric latices may be incorporated to enhance pressure resistance to a component layer of the photographic material. Preferred examples of latex polymers include a homopolymer of an alkyl acrylate, copolymer of acrylic acid and styrene, copolymer of styrene and butadiene, and a polymer comprised of a monomer containing an active methylene group, water-solubilizing group or a group capable of crosslinking gelatin or its copolymer. Specifically, to enhance miscibility with gelatin is preferably employed a copolymer comprised of a hydrophobic monomer, as a main component, such as alkyl acrylate or styrene and a monomer containing water-solubilizing group or a group capable of crosslinking gelatin. Examples of the monomer containing a water-solubilizing group include acrylic acid, methacrylic acid, maleic acid, 2-acrylamido-2-methylpropane-sulfonic acid and styrenesulfonic acid. Examples of the monomer containing a group capable of crosslinking gelatin include glycidyl acrylate, glycidyl methacrylate and N-methylol acrylamide.

The polymeric latex is preferably incorporated in an amount of 0.1 to 1.0 $g/m^2$.

To photographic materials used in the invention are incorporated various kinds of photographic adjuvants in accordance with various purposes. As the adjuvants, can be employed compounds as described in Research Disclosure (RD) No. 17643 (December, 1978), No. 18716 (November, 1979) and No. 308119 (December, 1989), wherein relevant types of compounds and sections thereof are as follows.

| Additive | RD-17643 Page | Sec. | RD-18716 Page | RD-308119 Page | Sec. |
|---|---|---|---|---|---|
| Chemical sensitizer | 23 | III | 648 upper right | 996 | III |
| Sensitizing dye | 23 | IV | 648–649 | 996–998 | IVA |
| Desensitizing dye | 23 | IV | | 998 | IVB |
| Dye | 25–26 | VIII | 649–650 | 1003 | VIII |
| Developing accelerator | 29 | XXI | 648 upper right | | |
| Antifoggant/stabilizer | 24 | VI | 649 upper right | 998–1000 | VI |
| Brightening agent | 24 | V | 647 upper right | 998 | V |
| Hardening agent | 26 | X | 651 left | 1004–1005 | X |
| Surfactant | 26–27 | XI | 650 right | 1005–1006 | XI |
| Antistatic agent | 27 | XIII | 650 right | 1006–1007 | XIII |
| Plasticizer | 27 | XII | 650 right | 1006 | XII |
| Lubricant | 27 | XII | 650 right | | |
| Matting agent | 23 | XVI | 650 right | 1008–1009 | XVI |
| Binder | 26 | IX | 651 left | 1003–1004 | IX |
| Support | 28 | XVII | | 1009 | XVII |

In cases where photographic materials according to the invention are employed as a double emulsion X-ray film for medical use, it is preferable to provide a cross-over light-shielding layer. Into the cross-over light shielding layer is preferably incorporated a dye in the form of a solid particle dispersion. Such a dye is not specifically limited, as far as the dye is soluble in a alkaline solution with a pH of 9 or more and scarcely soluble in a solution with a pH of 7 or less; and compounds of formula (I) described in JP-A 6-30870 are preferably employed in terms of discoloration characteristics in processing.

Supports usable in photographic materials used in the invention are described in above-described RD 17643, page 28 and RD 308119, page 1009.

Photographic materials according to the invention exhibit superior performance in rapid processing with an automatic processor in a total processing time of 15 to 60 sec.

The temperature and time of developing or fixing in the rapid processing are preferably 25 to 50° C. and 25 sec or less, and more preferably 30 to 40° C. and 4 to 15 sec, respectively. The photographic material is developed, fixed and then washed. Washing by counter current flow with multiple stage can be conducted to save water. when washed with a small amount of water, it is preferred to provide a squeezing roller in a washing bath. The photographic material which has been developed, fixed and washed, was dried via a squeezing roller. Drying is conducted at a temperature of 40 to 80° C. for a period of 4 to 30 sec. The total processing time refers to from the time of the top of a photographic material film being inserted into the inlet of the processor to the time of the top coming out of the drying outlet via a developing bath, cross-over section, fixing bath, cross-over section, washing bath, cross-over section and drying zone. The amount of gelatin used in photographic materials according to the invention can be reduced without deteriorating pressure characteristics, enabling rapid processing within a total processing time of 15 to 30 sec. without lowering any of developing rate, fixing rate and drying rate.

EXAMPLES

Embodiments of the present invention will be further explained, based on examples but the present invention is not limited to these examples.

Example 1

Preparation of Seed Emulsion-1

Seed emulsion-1 was prepared in the following manner.

Solution A1

| | |
|---|---|
| Ossein gelatin | 24.2 g |
| Water | 9657 ml |
| Sodium polyisopropylene-polyethyleneoxy-disuccinate (10% ethanol solution) | 6.78 ml |
| Potassium bromide | 10.8 g |
| 10% Nitric acid | 114 ml |

Solution B1

| | |
|---|---|
| 2.5 N Silver nitrate aqueous solution | 2825 ml |

Solution C1

| | |
|---|---|
| Potassium bromide | 824 g |
| Potassium iodide | 23.5 g |
| Water to make | 2825 ml |

Solution D1

1.75 N KBr aqueous solution for adjusting Ag potential

To Solution A1 maintained at 35° C. were added Solutions B1 and C1, each 464.3 ml for 1.5 min., with stirring by a mixer described in JP-B 58-58288 and 58-58299 to form nuclear grains (or seed grains).

Thereafter, Solution A1 was heated to 60° C. taking 60 min. After adjusting the pH to 5.0, solutions B1 and C1 were simultaneously added thereto at a flow rate of 55.4 ml/min. over a period of 42 min. During the course of a temperature-increase of 42 to 60° C. and addition of Solutions B1 and C1, Ag-potential was controlled at +8 mV and +16 mV with Solution D1, respectively. After completing addition, the pH was adjusted to 6 with 3% KOH aqueous solution and the resulting emulsion was desalted to obtain a seed emulsion-1. The emulsion was proved to be comprised of hexagonal tabular grains accounting for 90% of the projected area of total grains and having a maximum adjacent edge ratio of 1.0 to 2.0, an average thickness of 0.06 μm, an average diameter (circular equivalent diameter) of 0.59 μm, a variation coefficient of thickness of 40% and a variation coefficient of spaces between twin planes of 42%.

Preparation of Emulsion Em-1

Using seed emulsion-1 prepared above and four solutions as shown below, an emulsion Em-1 containing silver halide tabular grain having core/shell structure, was prepared in the following manner.

Solution A2

| | |
|---|---|
| Ossein gelatin | 11.7 g |
| Sodium polyisopropylene-polyethyleneoxy-disuccinate (10% ethanol solution) | 1.4 ml |
| Seed emulsion-1 | 0.10 mole eq. |
| Water to make | 550 ml |

Solution B2

| | |
|---|---|
| Ossein gelatin | 5.9 g |
| Potassium bromide | 6.2 g |
| Potassium iodide | 0.8 g |

-continued

| | |
|---|---|
| Water to make | 145 ml |

Solution C2

| | |
|---|---|
| Silver nitrate | 10.1 g |
| Water to make | 145 ml |

Solution D2

| | |
|---|---|
| Ossein gelatin | 6.1 g |
| Potassium bromide | 94 g |
| Water to make | 304 l |

Solution E2

| | |
|---|---|
| Silver nitrate | 137 g |
| Water to make | 304 ml |

To solution A2 with stirring at 67° C. were added solutions B2 and C2 by the double jet method in 58 min. Subsequently, solutions D2 and E2 were added by the double jet method in 48 min., while the pH and pAg were maintained at 5.8 and 8.7, respectively. After completing the addition, the emulsion was further desalted. There was obtained an emulsion having a pAg of 8.5, a pH of 5.58 and a mean iodide content of 0.5 mol %. The resulting emulsion was comprised of tabular silver halide grains having an average diameter of 0.96 μm, an average thickness of 0.25 μm, an average aspect ratio of 4.5 and a width of grain size distribution of 19%, accounting for 81% of the total grain projected area. It was proved that the mean spacing between twin planes (a) was 0.019 μm and a coefficient of variation of the (a) was 28%.

The obtained emulsion (Em-1) was heated to 60° C. and sensitizing dyes were added thereto in given amounts, in the form of a solid particle dispersion. Further thereto were added aqueous solutions of adenine, ammonium thiocyanate, chloroauric acid and sodium thiosulfate and a solution obtained by dissolving triphenylphosphine selenide in a mixed solvent of ethyl acetate and methanol; after 60 min., a fine silver iodide grain emulsion was added thereto and ripening was conducted over a total period of 2 hr. After completion of ripening, a given amount of 4-hydroxy-6-methyl-1,3,3a,7-tetrazaindene (TAI) was added as a stabilizer.

The above addenda and amounts (per mol of AgX) were as follows:

| | |
|---|---|
| Sensitizing dye (A) | 120 mg |
| Sensitizing dye (B) | 2.0 mg |
| Adenine | 15 mg |
| Ammonium thiocyanate | 95 mg |
| Chloroauric acid | 2.5 mg |
| Sodium thiosulfate | 2.0 mg |
| Triphenylphosphine selenide | 0.4 mg |
| Fine silver iodide grain | 280 mg |
| 4-Hydroxy-6-methyl-1,3,3a,7-tetrazaindene | 50 mg |

The solid particle dispersion of the spectral sensitizing dyes was prepared in accordance with a method described in JP-A 5-297496. Thus, a given amount of the sensitizing dye was added to water maintained at 27° C. and the mixture was stirred with a high-speed stirrer (Dissolver) at 500 rpm over a period of 30 to 120 min. to obtain the dispersion.

Sensitizing dye (A); 5,5'-Dichloro-9-ethyl-3,3'-di-(sulfopropyl)oxacarbocyanine sodium salt anhydride, Sensitizing dye (B); 5,5'-di-(butoxycarbonyl)-1,1'-diethyl-3,3'-di-(4-sulfobutyl)benzoimidazolocarbocyanine sodium salt anhydride.

On both sides of blue-tinted polyethylene terephthalate film base for use in X-ray with a thickness of 175 μm were simultaneously coated a cross-over light shielding layer, emulsion layer, and protective layer in this order so as to have coating amounts as shown below and dried. 1st Layer (Cross-over light shielding layer)

| | |
|---|---|
| Solid fine particle dispersion of dye (AH) | 50 mg/m$^2$ |
| Gelatin | 0.4 g/m$^2$ |
| Sodium dodecylbenzene sulfonate | 5 mg/m$^2$ |
| Compound (I) | 5 mg/m$^2$ |
| Sodium 2,4-dichloro-6-hydroxy-1,3,5-triazine | 5 mg/m$^2$ |
| Latex (L) | 0.2 mg/m$^2$ |
| Poly(potassium styrenesulfonate) | 50 mg/m$^2$ |

2nd Layer (Emulsion layer)

To the emulsions prepared as above were added the following additives.

| | |
|---|---|
| Potassium tetrachloropalladate (II) | 100 mg/m$^2$ |
| Compound (G) | 0.5 mg/m$^2$ |
| 2,6-Bis (hydroxyamino)-4-diethylamino-1,3,5-triazine | 5 mg/m$^2$ |
| t-Butyl-catechol | 130 mg/m$^2$ |
| Polyvinyl pyrrolidone (having a molecular weight of 10,000) | 35 mg/m$^2$ |
| A styrene-maleic acid anhydride copolymer | 80 mg/m$^2$ |
| Poly(sodium styrenesulfonate) | 80 mg/m$^2$ |
| Trimethylolpropane | 350 mg/m$^2$ |
| Diethylene glycol | 50 mg/m$^2$ |
| Nitrophenyl-triphenyl-phosphonium chloride | 20 mg/m$^2$ |
| Ammonium 1,3-dihydroxybenzene-4-sulfonate | 500 mg/m$^2$ |
| Sodium 2-mercaptobenzimidazole-5-sulfonate | 5 mg/m$^2$ |
| Compound (H) | 0.5 mg/m$^2$ |
| n-$C_4H_9OCH_2CH(OH)CH_2N(CH_2COOH)_2$ | 350 mg/m$^2$ |
| Compound (M) | 5 mg/m$^2$ |
| Compound (N) | 5 mg/m$^2$ |
| Tabular silica dispersion in an amount shown in Table 2 | |
| Latex (L) | 0.4 g/m$^2$ |
| Gelatin was adjusted to be in an amount shown in Table 2. | |

3rd Layer (Protective layer)

| | |
|---|---|
| Gelatin | 0.8 g/m$^2$ |
| 4-Hydroxy-6-methyl-1,3,3a,7-tetrazaindene | 50 mg/m$^2$ |
| Matting agent comprising polymethyl methacrylate (having an area average particle-size of 7 μm) | 50 mg/m$^2$ |
| Tabular silica dispersion in an amount shown in Table 2 | |
| $[CH_2{=}CH{-}SO_2{-}CH_2CONHCH_2{-}]_2$ | 100 mg/m$^2$ |
| Sodium 2,4-dichloro-6-hydroxy-1,3,5-triazine | 10 mg/m$^2$ |
| Bis-vinylsulfonylmethyl ether | 36 mg/m$^2$ |
| Latex (L) | 0.2 mg/m$^2$ |
| Polyacrylamide (mean M.W of 10,000) | 0.1 mg/m$^2$ |
| Poly(sodium acrylate) | 30 mg/m$^2$ |
| Compound (SI) | 20 mg/m$^2$ |
| Compound (I) | 12 mg/m$^2$ |
| Compound (J) | 2 mg/m$^2$ |
| Compound (S-1) | 7 mg/m$^2$ |
| Compound (K) | 15 mg/m$^2$ |
| Compound (O) | 50 mg/m$^2$ |
| Compound (S-2) | 5 mg/m$^2$ |
| Compound (F-1) | 3 mg/m$^2$ |
| Compound (F-2) | 2 mg/m$^2$ |
| Compound (F-3) | 1 mg/m$^2$ |

Latex (L)
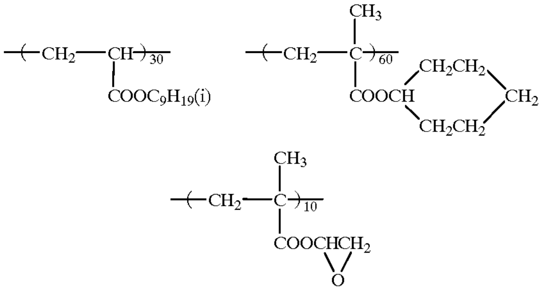
Compound (I)
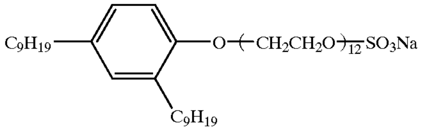
Compound (G)
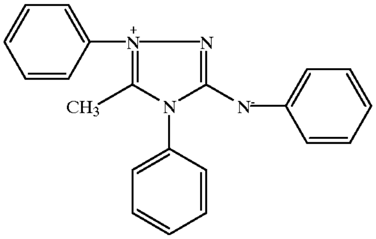
Compound (H)
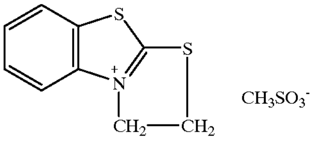
Dye AH (solid particle dispersion)
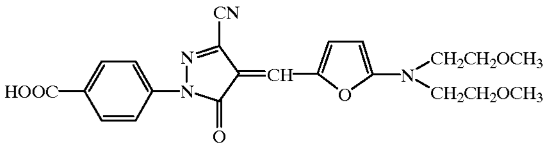
Compound (M)
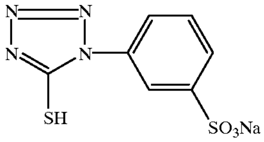
Compound (N)
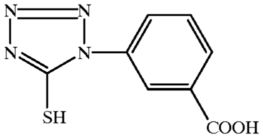
Compound (J)
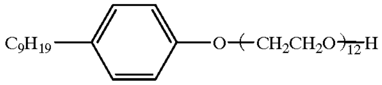
Compound (SI)
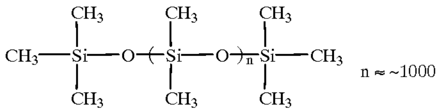
Compound (S-1)
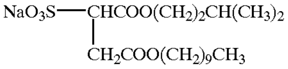
Compound (K)
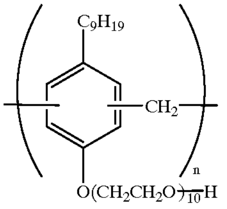
(Mixture of n = 2–5)
Compound (O)
$C_{11}H_{23}CONH(CH_2CH_2O)_5H$
Compound (S-2)
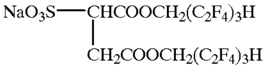
Compound (F-1)
$C_9H_{19}O{+}CH_2CH_2O{+}_{11}H$
Compound (F-2)
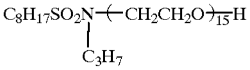

Compound (F-3)

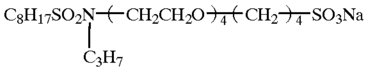

The coating amount of addenda was per one side the amount of silver was 1.6 $g/m^2$ of one side.

1) Evaluation of Sensitivity

The thus obtained photographic material samples each were sandwiched between radiographic intensifying screens SRO-250 (available from Konica Corp.), exposed to X-rays through penetrometer type B and processed using a roller transport type automatic processor, SRX-501 (available from Konica Corp.), and the following developer and fixer solutions, under the process-1 or process-2 condition.

Process-1

| | | |
|---|---|---|
| Developing | 35° C. | 14.0 sec. |
| Fixing | 34° C. | 9.7 sec. |
| Washing | 26° C. | 9.0 sec. |
| Squeezing | | 2.4 sec. |
| Drying | 55° C. | 8.3 sec. |
| Total (Dry to Dry) | | 43.4 sec. |

Developer (for 12 liter)

Part A

| | |
|---|---|
| Potassium hydroxide | 450 g |
| Potassium sulfite (50% aq. solution) | 2280 g |
| Diethylenetriamine pentaacetic acid | 120 g |
| Sodium hydrogencarbonate | 132 g |
| 5-Methylbenztriazole | 1.2 g |
| 1-Phenyl-5-mercaptotetrazole | 0.2 g |
| Hydroquinone | 340 g |
| Water to make | 5000 ml |

Part B

| | |
|---|---|
| Glacial acetic acid | 170 g |
| Triethylene glycol | 185 g |
| 1-Phenyl-3-pyrazolidone | 22 g |
| 5-Nitroindazole | 0.4 g |

Starter

| | |
|---|---|
| Glacial acetic acid | 120 g |
| Potassium bromide | 225 g |
| Water to make | 1 liter |

Fixer (for 18 liter)

Part A

| | |
|---|---|
| Ammonium thiosulfate (70 wt/vol %) | 6000 g |
| Sodium sulfite | 110 g |
| Sodium acetate trihydride | 450 g |
| Sodium citrate | 50 g |
| Gluconic acid | 70 g |
| 1-(N,N-dimethylamino)-ethyl-5-mercaptotetrazole | 18 g |

Part B

| | |
|---|---|
| Aluminum sulfate | 800 g |

To 5 liters of water were simultaneously added part A and B of the developer with stirring, and water was further added thereto to make 12 liters of the developer. The pH was adjusted to 10.40. This developer solution was employed as a replenisher.

To 1 liter of this replenisher was added 20 ml of the starter and the pH was adjusted to 10.26 to make a working solution.

To 5 l of water was added part A of the fixer with stirring and water was further added thereto to make 18 liters, and the pH was adjusted to 4.4 using sulfuric acid or NaOH to make up a fixer replenisher.

Process-2

Using a modified processor of the SRX-501 used in Process-1 and the same developer and fixer solutions as in Process-1, photographic material samples were processed according to the following steps:

| | | |
|---|---|---|
| Developing | 38° C. | 7 sec. |
| Fixing | 37° C. | 4 sec. |
| Washing | 26° C. | 7 sec. |
| Squeezing | | 2.4 sec. |
| Drying | 58° C. | 4 sec. |
| Total (Dry to Dry) | | 24.4 sec. |

Sensitivity was shown as a relative value of reciprocal of exposure necessary to give a density of fog plus 1.0, based on the sensitivity of sample 1 being 100.

Evaluation of Pressure Resistance

After unexposed samples were allowed to stand for 2 hr. under conditions at 23° C. and 40% RH, the surface of each sample was scratched by a sapphire needle of 0.1 mm in diameter with continuously increasing load from 0 to 200 g, using a continuously loading scratch tester, HEIDON type 18 (which is available from Shinto Kagaku Corp.) and then subjected to processing according to the Process-1. The load necessary to give a density of fog plus 0.1 was determined as a measure of pressure resistance. Thus, the more this value, the better pressure resistance.

Evaluation of Roller Stain

After 2,000 sheets of 250 mm×300 mm of each sample were continuously processed according to Process-1 or Process-2, a cross-over roller provided between developing and fixing baths of the processor was observed with respect to stain attached to the roller. Roller stain was evaluated based on the following criteria:

A: No stain observed,

B: Slight stain observed but acceptable for practice,

C: Marked stain observed and substantially non-acceptable for practice.

D: Stains were observed on all sides and completely nonacceptable for practice.

Results are summarized in Table 1.

TABLE 1

| Sample No. | Tabular Silica Em Layer*[1] (g/m²) | Tabular Silica Pro Layer*[2] (g/m²) | Cyclodetrin Kind | Cyclodetrin Layer (g/m²) | Gelatin in Emulsion Layer (g/m²) | Process-1 S | Process-1 St | Process-2 S | Process-2 St | Pressure Resistance (g) | Remark |
|---|---|---|---|---|---|---|---|---|---|---|---|
| 1 | — | — | — | — | 1.0 | 100 | A | 94 | A | 57 | Comp. |
| 2 | Comp a (0.5) | — | — | — | 1.0 | 96 | A | 90 | A | 130 | Comp. |
| 3 | Camp b (0.5) | — | — | — | 1.0 | 95 | A | 91 | A | 129 | Comp. |
| 4 | — | — | β-Cd*[3] | Em layer (0.5) | 1.0 | 108 | C | 99 | D | 46 | Comp. |
| 5 | — | — | K-1 | Em layer (0.5) | 1.0 | 107 | B | 98 | C | 78 | Comp. |
| 6 | — | — | K-2 | Em layer (0.5) | 1.0 | 107 | B | 99 | C | 80 | Comp. |
| 7 | Comp a (0.5) | — | β-Cd*[3] | Em layer (0.5) | 1.0 | 101 | C | 94 | D | 120 | Comp. |
| 8 | Comp a (0.5) | — | K-1 | Em layer (0.5) | 1.0 | 100 | B | 93 | C | 131 | Comp. |
| 9 | Comp a (0.5) | — | K-2 | Em layer (0.5) | 1.0 | 100 | B | 93 | C | 132 | Comp. |
| 10 | B-1 (0.5) | — | — | — | 1.0 | 110 | A | 105 | A | 151 | Inv. |
| 11 | B-2 (0.5) | — | — | — | 1.0 | 109 | A | 103 | A | 150 | Inv. |
| 12 | B-3 (0.5) | — | — | — | 1.0 | 108 | A | 103 | A | 149 | Inv. |
| 13 | B-4 (0.5) | — | — | — | 1.0 | 109 | A | 103 | A | 148 | Inv. |
| 14 | B-5 (0.5) | — | — | — | 1.0 | 108 | A | 104 | A | 150 | Inv. |
| 15 | B-6 (0.5) | — | — | — | 1.0 | 109 | A | 102 | A | 154 | Inv. |
| 16 | B-7 (0.5) | — | — | — | 1.0 | 109 | A | 102 | A | 155 | Inv. |
| 17 | — | B-1 (0.5) | — | — | 1.0 | 107 | A | 102 | A | 143 | Inv. |
| 18 | — | B-2 (0.5) | — | — | 1.0 | 106 | A | 102 | A | 142 | Inv. |
| 19 | B-1 (0.1) | — | — | — | 1.0 | 103 | A | 101 | A | 140 | Inv. |
| 20 | B-1 (1.0) | — | — | — | 1.0 | 114 | A | 107 | A | 165 | Inv. |
| 21 | B-1 (0.5) | — | — | — | 0.6 | 112 | A | 109 | A | 139 | Inv. |
| 22 | B-1 (0.5) | — | — | — | 1.4 | 104 | A | 101 | A | 160 | Inv. |

*[1]Emulsion Layer
*[2]Protective Layer
*[3]β-cyclodextrin
Comp. a: Lucentite SWN (sold by Cope Chemical Corp.)
Comp. b: Lucentite SWF (sold by Cope Chemical Corp.)

As can be seen from Table 1, photographic materials by using the tabular silica dispersion according to the invention, exhibited superior pressure resistance and no or little stain even when subjected to rapid processing.

What is claimed is:

1. A tabular silica dispersion obtained by mixing a tabular silica, gelatin, a cyclodextrin and a compound capable of crosslinking gelatin.

2. The tabular silica dispersion of claim 1, wherein said compound capable of crosslinking gelatin is a silane coupling agent.

3. The tabular silica dispersion of claim 1, wherein said cyclodextrin is represented by the following formula (A) or (B):

Formula (A)

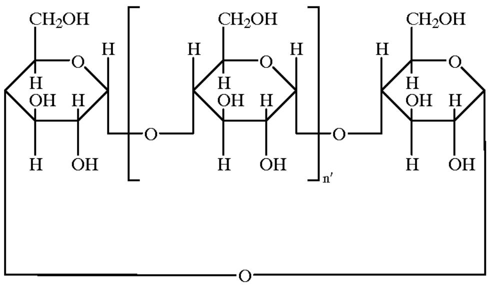

wherein n' is an integer of from 4 to 10;

Formula (B)

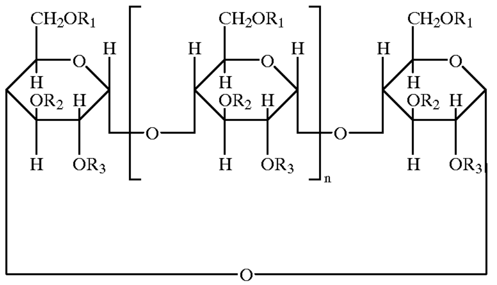

wherein $R_1$, $R_2$ and $R_3$ each represent a hydrogen atom, an alkyl group, an alkenyl group, an aryl group, a heterocyclic group, or a group capable of crosslinking gelatin, provided that at least two groups capable of crosslinking gelatin are present in the formula; and n is an integer of 4 to 10.

4. The tabular silica dispersion of claim 1, wherein said cyclodextrin is one containing a group capable of crosslinking gelatin.

5. The tabular silica dispersion of claim 4, wherein the group capable of crosslinking gelatin is introduced using a compound selected from the group consisting of 2-hydroxy-4,6-dichloro-s-triazine, epichlorohydrin, epibromohydrin, epifluorohydrin, epiiodohydrin, ethylchloroformate, phenylchloroformate, 3-hydroxyphenylchloroformate, 3-methoxyphenylchloroformate, 2-chloroethylchloroformate and 4-chlorophenylchloroformate.

6. The tabular silica dispersion of claim 1, wherein said cyclodextrin is mixed in an amount of 0.1 to 1.0 mmol per g of gelatin.

7. The tabular silica dispersion of claim 1, wherein said tabular silica is mixed in an amount of 0.1 to 15 g per g of gelatin.

8. The tabular silica dispersion of claim 1, wherein said compound capable of crosslinking gelatin is mixed in an amount of 0.01 to 2.5 mmol per g of gelatin.

9. The tabular silica dispersion of claim 1, wherein said cyclodextrin is a cyclodextrin containing a group capable of crosslinking gelatin, and said compound capable of crosslinking gelatin is a silane coupling agent.

10. The tabular silica dispersion of claim 1, wherein said tabular silica has an aspect ratio of 2 to 100.

11. The tabular silica dispersion of claim 10, wherein said tabular silica has circle equivalent diameter of 2 to 300 nm.

12. The tabular silica dispersion of claim 9, wherein said tabular silica has an aspect ratio of 2 to 100.

13. The tabular silica dispersion of claim 12, wherein the group capable of crosslinking gelatin is introduced using a compound selected from the group consisting of 2-hydroxy-4,6-dichloro-s-triazine, epichlorohydrin and ethylchloroformate.

14. The tabular silica dispersion of claim 12, wherein said cyclodextrin, tabular silica and silane coupling agent are mixed in amounts of 0.1 to 1.0 mol/g of gelatin, 0,1 to 15 g per g of gelatin, and 0.01 to 2.5 mmol per g of gelatin, respectively.

15. A silver halide photographic light-sensitive material comprising a support having thereon a silver halide emulsion layer and a light-insensitive hydrophilic colloidal layer, wherein said photographic material is obtained by coating a coating composition obtained by incorporating a tabular silica dispersion as claimed in claim 1 into a composition constituting the silver halide emulsion layer or light-insensitive hydrophilic colloidal layer.

* * * * *